US006757217B2

(12) United States Patent
Eastwood et al.

(10) Patent No.: US 6,757,217 B2
(45) Date of Patent: Jun. 29, 2004

(54) METHOD FOR TIME-ALIGNING MULTIPLE OFFSET SEISMIC DATA VOLUMES (75) Inventors: John E. Eastwood, Bellaire, TX (US);
Brian P. West, Houston, TX (US);
Michael D. Gross, Stavanger (NO);
Dwight C. Dawson, Spring, TX (US);
David H. Johnston, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 111 days.

(21) Appl. No.: 10/230,793

(22) Filed: Aug. 29, 2002

(65) Prior Publication Data

US 2003/0043693 A1 Mar. 6, 2003

Related U.S. Application Data

(60) Provisional application No. 60/316,396, filed on Aug. 31, 2001.

(51) Int. Cl.[7] ............................. G01V 1/36; G06F 19/00
(52) U.S. Cl. ............................. 367/52; 367/38; 367/40; 367/43; 367/45; 367/50; 367/70; 702/14; 702/17
(58) Field of Search ............................. 367/38, 40, 43, 367/45, 50, 70; 702/14, 17

(56) References Cited

U.S. PATENT DOCUMENTS

| | | | | |
|---|---|---|---|---|
| 4,203,161 A | | 5/1980 | Johnson et al. | |
| 4,554,649 A | * | 11/1985 | Herkenhoff et al. | 367/68 |
| 4,570,246 A | * | 2/1986 | Herkenhoff et al. | 367/68 |
| 4,679,174 A | | 7/1987 | Gelfand | 367/73 |
| 4,980,866 A | * | 12/1990 | Wang et al. | 367/52 |
| 4,992,996 A | * | 2/1991 | Wang et al. | 367/53 |
| 5,487,001 A | | 1/1996 | Neff | 364/421 |
| 6,266,620 B1 | * | 7/2001 | Baeten et al. | 702/17 |
| 6,516,275 B2 | * | 2/2003 | Lazaratos | 702/17 |
| 2002/0141287 A1 | * | 10/2002 | Lazaratos | 367/120 |

OTHER PUBLICATIONS

Herrmann et al, Statistictly uncorrelated AVO attributes, Jun. 15, 2001, 63rd EAGE Conference, vol. 2, paper No. p–187 4 pages.*

Mukerji et al, Near and far offset impedances, Geophysical Res. Letters, vol. 25, pp. 4557–4560, Dec. 15, 1998.*

De Groot, P. F. M., Volume transformation, by way of Neural network mapping, 61st EAGE Conference, Jun. 11, 1999, Paper No. 3–37.*

(List continued on next page.)

*Primary Examiner*—Nelson Moskowitz
(74) *Attorney, Agent, or Firm*—Charles R. Schweppe (57) ABSTRACT

Near-offset and far-offset seismic data volumes are time-aligned by first selecting a plurality of time shifts. The near-offset and far-offset seismic data volumes are cross-correlated at the plurality of time shifts. An initial time-shift volume and a maximum correlation volume are created from the maximal cross-correlations at the plurality of time shifts. Areas of high time shift from the initial time-shift volume and areas of low cross-correlation from the maximum correlation volume are determined. The determined areas of high time shift and low cross-correlation are filtered from the initial time-shift volume, generating a filtered time-shift volume. The filtered time-shift volume is applied to the far-offset seismic volume to generate a time-aligned far-offset volume.

8 Claims, 9 Drawing Sheets

OTHER PUBLICATIONS

Nada et al, Evaluating geophysical lithology determination, 64th Annual SEG int. meeting, Oct. 28, 1994, pp. 1112–1113, paper No. SL2.*

Ratcliffe and Adler, 2000, "Accurate Velocity Analysis for Class II AVO Events", SEG 2000 Expanded Abstracts, SEG International Expo and 70th Annual Meeting, vol. 1, Calgary, Alberta, Canada, Aug. 6–11, 2000, pp. 232–235.

Baltz, Pivot and Badolato, 2000, "Fast Indentification of AVO–Anomalies Using Classification of Prestack Waveforms", SEG 2000 Expanded Abstracts, SEG Int'l Expo. and 70th Annual Meeting, vol. 1; Calgary, Alberta, Canada, Aug. 6–11, 2000, pp. 106–109.

Eastwood, John et al, 1998, "Processing for Robust Time–Lapse Seismic Analysis: Gulf of Mexico Example, Lena Field", SEG 1998 Annual Mtg., vol. 1, New Orleans, LA, Sep. 13–18, 1998, pp. 20–23.

Johnston, David H. et al., 2000, "Using Legacy Seismic Data in an Integrated Time–Lapse Study: Lena Field, Gulf of Mexico", The Leading Edge, Apr. 2000, pp. 294–302.

Reilly, Keys et al., "High Fidelity Inverse Estimate of AVO Response", SEG Houston 69th Annual Meeting, 1999.

* cited by examiner

```
☐ Calculate trace to trace bulk shift

Size of LARGE correlation window in ms        [504]
Maximum allowable time shift for large window ms   [20]

☐ Enable Small Window

Size of SMALL correlation window in ms        [200]
Maximum allowable time shift for small window ms   [20]

QC by:                   Inline ▫

Select Single line         ◇ Single Line
    or 3D Volume
                                 [0]

◇ 3D Volume

OK                  Calculate Now

Click Ok to          Click Calculate Now
  accept values        to start calculation
```

Lag Time (ms)

METHOD FOR TIME-ALIGNING MULTIPLE OFFSET SEISMIC DATA VOLUMES

This application claims the benefit of U.S. Provisional Application No. 60/316,396 filed on Aug. 31, 2001.

BACKGROUND OF THE INVENTION

1. Field of the Invention

This invention relates generally to the field of geophysical prospecting. More particularly, the invention relates to the field of seismic data processing. Specifically, the invention is a method of time-aligning near-offset and far-offset seismic data volumes.

2. Description of the Related Art

The ability of geoscience interpreters to perform quantitative volumetric AVO (Amplitude Versus Offset) analysis for the exploration, development and production of hydrocarbon resources depends upon the accurate alignment between multiple offset seismic volumes. AVO analysis requires the simultaneous analysis of two or more pre-stack time offset or angle volumes and the resulting generation of accurate derivative AVO attribute volumes. The goal of the analysis is to quantify and discriminate the anomalies from the background trends. As large high-resolution 3D seismic surveys are now commonplace in industry, a timely, quantitative analysis is required to impact business decisions. Volume-based AVO analysis can add significant contributions to a geologic/geophysical understanding of a target, even in exploration and early development where well control is sparse. However, practical circumstances generally preclude full 3D pre-stack AVO inversion. In place of a full theoretical consideration, significant quantitative information can be gleaned from just near-offset and far-offset volumes. However, working with just two stacked offset volumes (effectively a two-point gather) requires a disciplined and deliberate workflow to ensure that the final products are geophysically realistic.

Even after application of a state of the art AVO processing stream, small differences in the alignment of stacked AVO seismic data volumes prevent accurate, direct (point-for-point) differencing of these data. This misalignment hinders the accurate calculation of three-dimensional volume-based seismic AVO attributes. There are two main techniques used in the oil industry to automate or enhance the calculation of AVO attributes. These techniques are (1) horizon-based quantitative AVO analysis and (2) a seismic inversion approach to either elastic impedance or Vp, Vs, and density in vendor software. In general, horizon based methods are more time consuming than volume-based methods. Examples of these techniques or variants of them are discussed next.

The software product GWB, by the vendor Jason, allows the user to grossly align multiple seismic volumes with multiple-horizon, window-based cross-correlations. This technique will allow for the gross alignment of volumes. Unless numerous horizons are used, this method will produce much less precise results than the new method disclosed herein. Additionally, GWB does not allow for sub-sample interpolation, or for retaining and exploiting the time shift and cross-correlation volumes for filtering or AVO analysis. The Jason approach requires well control and good Vp and Vs log data to facilitate the extraction of seismic wavelets.

U.S. Pat. No. 4,203,161 to Johnson, Parrack and Lunsford, discloses using a cross correlation metric to time-shift seismic trace segments. This process is done pre-stack and therefore is purely a processing technique. They do not discuss use in post-stack migration or for quantitative analysis.

Ratcliffe and Adler, "Accurate Velocity Analysis for Class II AVO Events", discuss a method for better AVO velocity analysis for prestack data when class II AVO anomalies exist. (SEG 2000 Expanded Abstracts, SEG International Exposition and Seventieth Annual Meeting, Calgary, Alberta, Aug. 6–11, 2000). Their method evaluates the move out correction relative to the validity of the resulting AVO. This technique, however, can not be applied to near-and far-offset seismic data volumes.

Balz and Pivot, "Fast Identification of AVO Anomalies Using Classification of Pre-Stack Waveforms", SEG 2000 Expanded Abstracts, Society of Exploration Geophysicists International Exposition and Seventieth Annual Meeting, Calgary, Alberta, Aug. 6–11, 2000, discuss a methodology using self-organising maps or κ means clustering to classify AVO response. Their method is designed to work with pre-stack seismic data and for a specific interval defined through horizon interpretation. Their method is interval-based and not volume-based. There is no mention of building a 3D consistent time shift volume to time align AVO cubes, or exploiting multiple attributes for AVO classification, such as cross correlation and near and far product with difference. Additionally, they do not mention the use of a probabilistic neural network approach with user defined training.

Two publications, (1) Eastwood et al., "Processing for Robust Time-Lapse Seismic Analysis: Gulf of Mexico Example, Lena Field," Society of Exploration Geophysicists, 1998 Annual Meeting and (2) Johnston, D., Eastwood, J. and Shyeh, J., "Seismic Monitoring Lena Gulf of Mexico", The Leading Edge, April, 2000, disclose a rudimentary version of a cross-correlation algorithm for time lapse or 4D seismic applications. These publications discuss the use of the aligned volumes to help resolve residual migration and alignment issues between multiple legacy 3D surveys and to facilitate the differencing of 3D seismic surveys acquired through time. Additionally, two new 4D seismic attribute volumes were introduced, the time-shift volume and the cross correlation volume. However, this algorithm did not have the capability of interactive filtering of time shift and correlation volumes to improve the spatial and temporal difference. Furthermore, the algorithm did not have the dual window cross correlation capability or an iterative workflow approach. Finally, the use of the algorithm for AVO analysis was not discussed.

In their publication, "High-Fidelity Inverse Estimate of AVO Response", Society of Exploration Geophysists, $69^{th}$ Annual Meeting, Houston, Tex., 1999, Reilly et al. disclose a rule-based alignment method. This method selects all the peaks and troughs in the seismic traces of near offset and far offset seismic data volumes. Then, using the far offset volume as the frame of reference, the method searches for closest extremums in the near offset cube, limited by the far offset zero crossings or inflection points and other user-selected constraints. Once alignment has been achieved the maximum of the absolute value of either the far*(far-near) attribute or near*(far-near) attribute is retained. The output volume format is either a sparse spike reflection series or a blocked reflection series. Prior to differencing, relative amplitude scaling is achieved with a long-time-varying trace-to-trace gain equalization. This method, however, does not retain the seismic frequency content in the data. Furthermore, it is a single trace-to-trace operation with no volume based filtering, and no creation of time shift and correlation volumes and subsequent exploitation of these volumes to create a spatially and temporally consistent difference volume. Finally, the calculation is done at discrete sample intervals of ¼ of the SEGY sample rate.

Thus, a need exists for a method that improves the alignment of offset seismic data, enabling the calculation and manipulation of higher-resolution AVO data.

SUMMARY OF THE INVENTION

The invention is a method for time-aligning near-offset and far-offset seismic data volumes. In one embodiment, a plurality of time shifts are first selected. The near-offset and far-offset seismic data volumes are cross-correlated at the plurality of time shifts. An initial time-shift volume and a maximum correlation volume are created from the maximal cross-correlations at the plurality of time shifts. Areas of high time shift from the initial time-shift volume and areas of low cross-correlation from the maximum correlation volume are determined. The determined areas of high time shift and low cross-correlation are filtered from the initial time-shift volume, generating a filtered time-shift volume. Finally, the filtered time-shift volume is applied to the far-offset seismic volume to generate a time-aligned far-offset volume.

In an alternative embodiment, after the step of selecting the plurality of time shifts is done, the remaining steps of cross-correlating the near-offset and far-offset seismic data volumes through applying the filtered time-shift volume are repeated in an iterative process.

The invention can also be used to align pairs of data sets other than far offset and near offset data, for example: time-lapse seismic surveys or any instance of multiple versions of seismic data.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The invention is a method for time-aligning near-offset and far-offset seismic data volumes for quantitative AVO analyses. The method of the invention takes near-offset and far-offset seismic data volumes as input and generates a time-aligned far-offset volume and two derivative AVO volumes as output. The first derivative AVO volume is a time shift volume used to time-align the far-offset volume. The second AVO derivative volume is a maximum correlation volume. Both derivative AVO volumes are used as quality controls for the time alignment process. All output volumes can be subsequently used to produce classification volumes, thus assisting in the use of volumetric AVO attribute data for reservoir identification and characterization.

Figure 1:
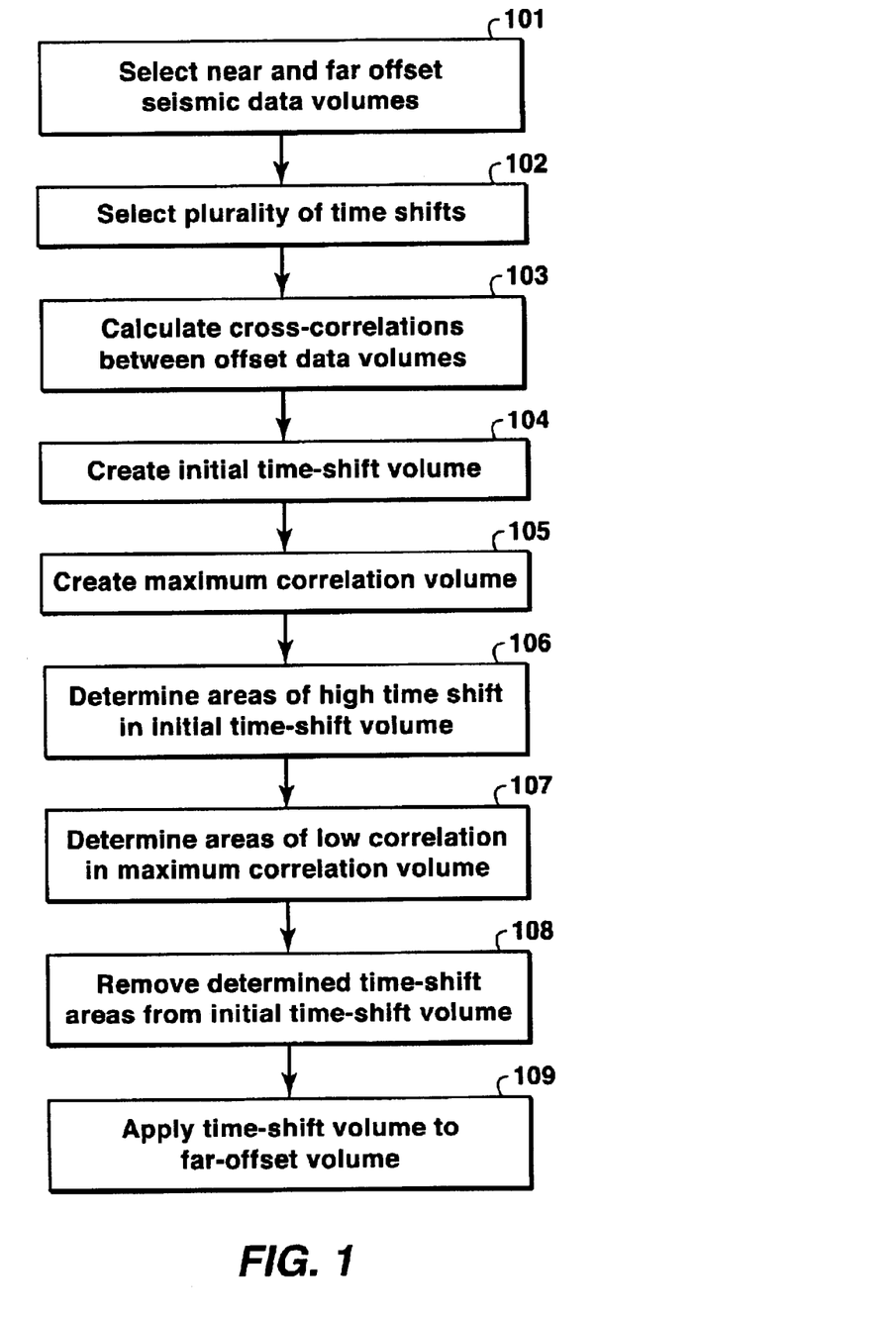
FIG. 1 is a flow chart illustrating the method of an embodiment of the present invention.

FIG. 1 is a flow chart illustrating the method of an embodiment of the present invention. First, in step 101, two three-dimensional volumes of near-offset and far-offset seismic data, respectively, are selected. These offset seismic data volumes preferably are, but are not restricted to, zero-phase, quadrature, or integrated trace basis, depending on the application. Although three-dimensional volumes of data are discussed, the method works equally well for pairs of two-dimensional data sets. These offset seismic data volumes will be used to calculate a time-aligned far-offset volume and corresponding time-shift and correlation volumes. Preferably, the spectral frequency content of the near-offset and far-offset seismic data volumes is similar. Providing near and far volumes with similar bandwidths can be achieved and quality controlled with any of many methods well known in the art of seismic processing.

In step 102, a plurality of time shifts are selected. The time shifts, also called time lags, are preferably selected to cover a range of time shifts expected to time align the far-offset and near-offset seismic data volumes selected in step 101. User constraints may be optionally selected to define proper time alignment.

In step 103, cross-correlations are calculated between the near-offset and far-offset seismic data volumes selected in step 101 at each of the plurality of time shifts selected in step 102. The cross-correlations are preferably calculated using a coherency or semblance calculation, as well known in the art of seismic processing. However, the method of the invention is not restricted to these particular types of cross-correlations and any other three-dimensional objective function based algorithm can be used. These cross-correlation calculations are preferably performed with 'on-the-fly' sub-sample interpolation.

Figure 2A:
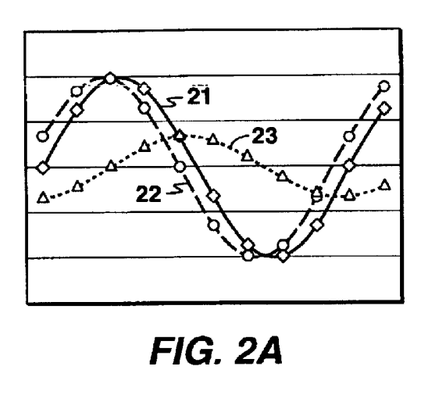
FIG. 2A is a plot of two waveforms that are adequately sampled, but slightly out of phase.
Figure 2B:
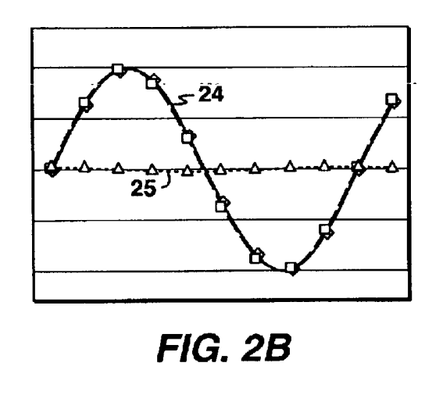
FIG. 2B is a plot of the two waveforms from FIG. 2A as sampled by the method of the invention.

FIGS. 2A and 2B illustrate the need for precise alignment with sub-sample interpolation. FIG. 2A shows two waveforms 21 and 22 that are adequately sampled at 10 samples per waveform. However, these discrete samples are out of slightly out of phase. Thus, even when these discrete samples are optimally aligned, the error (difference) is 40% of the maximum amplitude as is shown by curve 23. FIG. 2B shows that the two waveforms are practically indistinguishable (curve 24) after alignment correction by the method of the present invention. Here, the error (curve 25) is reduced to less than 1% of the maximum amplitude.

Test calculations with the method of the invention show that in order to achieve an accuracy of less than 1% error in differencing, seismic traces in the offset seismic data volumes would need to be over sampled twelve fold over the Nyquist sampling. (According to Nyquist's theorem, the minimum sampling frequency for detecting a given frequency is twice the given frequency and is called the Nyquist frequency.) This over-sampling, however, would substantially increase computational and storage costs.

Returning to FIG. 1, in step 104, an initial time-shift volume is created from the cross-correlations calculated in step 103. The initial time shift volume is created by storing the time shifts from step 102 that bring the seismic data offset volumes closest to time alignment. This time alignment can determined according to constraints defined by the user. The initial time shift volume is preferably created by storing the time shift from the plurality of time shifts selected in step 102 corresponding to the maximum cross-correlation value calculated in step 103 at a position corresponding to each position in the near-offset and far-offset seismic data volumes from step 101. This volume creation may also be done by any of other methods well known in the art of seismic processing.

In step 105, a maximum correlation volume is created from the cross-correlations calculated in step 103. The maximum correlation volume is created by storing the cross-correlation values from step 103 that bring the seismic data offset volumes closest to time alignment at each position in the volumes. In an alternative embodiment, constraints, may be defined by the user to determine sufficient time alignment. The maximum correlation volume is preferably created by storing the maximum cross-correlation, as defined by the calculated coherence or semblance in step 103, corresponding to the time shift selected and stored in step 104 at a position corresponding to each position in the initial time shift volume. This volume creation may also be done by any of other methods well known in the art of seismic processing.

Even with user-defined constraints, spurious alignments, due to factors such as noise in the seismic data, can result from the use of single trace moving cross-correlation algorithms. Interactive filtering in three dimensions would improve the spatial and temporal consistency of the initial time shift volume, thus minimising the effects of noise. Further, the exclusion of large time shifts associated with low correlations in the maximum correlation volume would significantly improve the continuity of the initial time shift volume. The method of the invention allows both of these steps.

Figure 3:
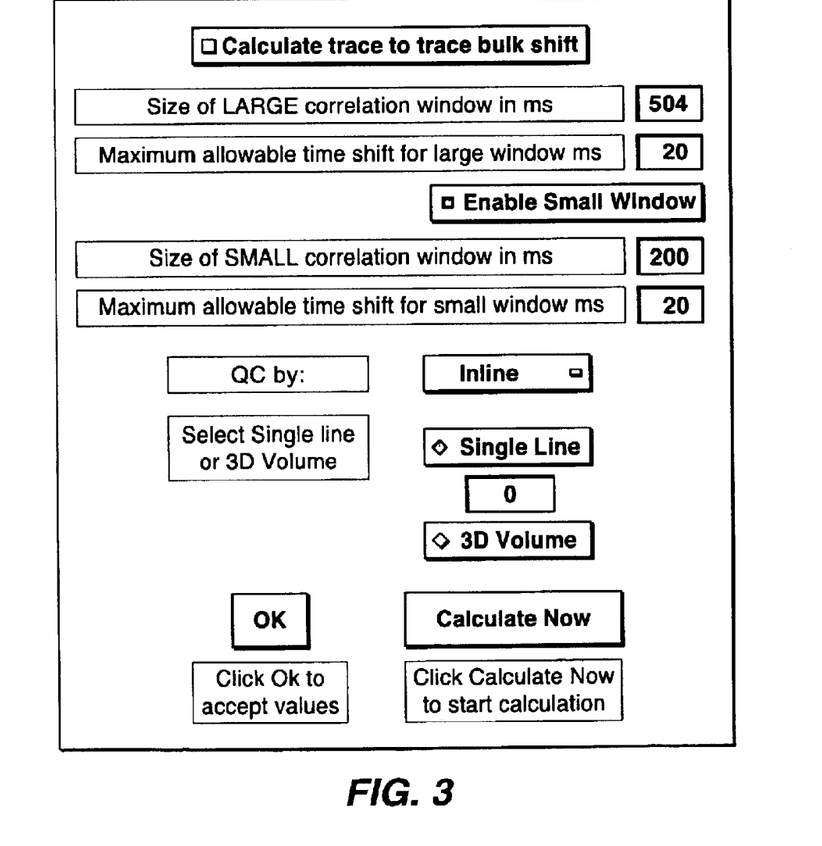
FIG. 3 is an input display panel used to specify the time-alignment parameters in an embodiment of the method of the invention.

FIG. 3 shows an input display panel used to specify the time-alignment parameters in an embodiment of the method of the invention. The moving window for the cross-correlation and time shift calculation is specified in this display panel as well as the maximum allowable time shift. In dual window mode, two window sizes are considered simultaneously. If the small window has a better correlation and is within the constraints of the large window, then the small window alignment is favoured. Conversely if the small window correlation is poor, then the alignment from the large window correlation is favoured.

Figure 4A:
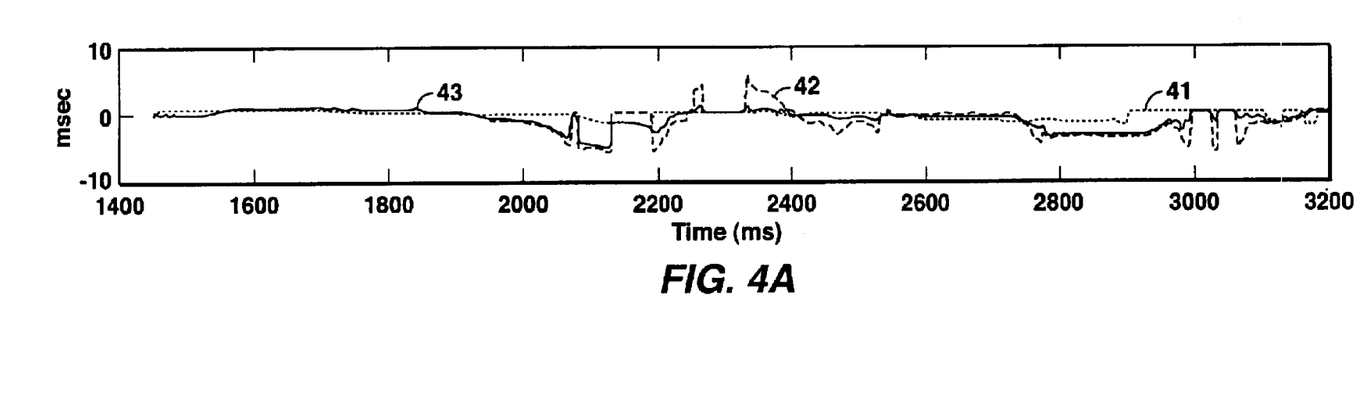
FIGS. 4A and 4B are input display panels used for time alignment quality control in an embodiment of the method of the invention.
Figure 4B:
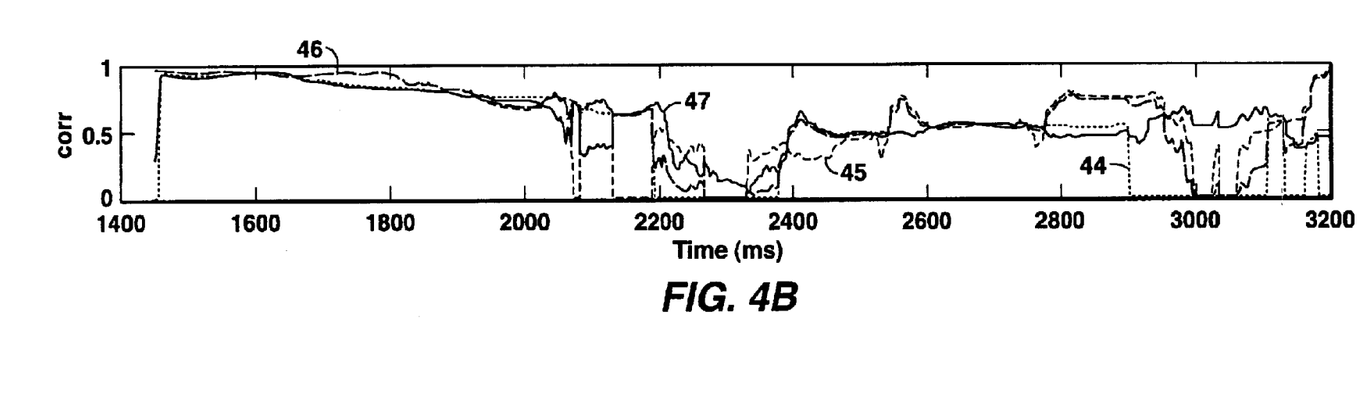

FIGS. 4A and 4B show input display panels used for time alignment quality control in an embodiment of the method of the invention. These display panels show views of statistics of the expected output before the entire three-dimensional output volumes are processed. This helps the user select the optimal time-alignment parameters in the display panel shown in FIG. 3.

In FIG. 4A, the time shift is plotted on the vertical axis, vs. two-way vertical travel time. (Vertical travel time is used in seismic analysis as a measure of spatial position in the vertical dimension. The two horizontal dimensions are often referred to as inline and crossline position.) Line 41 is the time shift from the large window, and line 42 is from the small window. Line 43 represents an attempt to select the best log value based on the cross correlation values from FIG. 4B.

In FIG. 4B, the correlation as calculated over the large window (44) and small window (45) is plotted vs. two-way travel time. Line 46 is the average of the small and large window correlations, and line 47 shows the correlation values corresponding to the line 43 log values in FIG. 4A.

The trade-off between selecting a small window vs. a large window is the absolute alignment that is easy to get with a small enough window vs. the spatial continuity that is improved by making the window larger. The problem with large time shifts, and hence the need for the parameter in FIG. 3 for maximum allowable time shift, is discussed below. FIGS. 4A and 4B provide input to the user to help select the parameter settings for FIG. 3.

Returning to FIG. 1, in step 106, areas of inappropriate time shift are determined from the initial time-shift volume created in step 104. Similarly, in step 107, areas of inappropriate cross-correlation are determined from the maximum correlation volume created in step 105. The quality of the initial time shift, and hence the resulting time-shifted far-offset seismic data volume, is dependent upon the quality of the input offset seismic data. Generally, a decrease in quality of the time-alignment data is seen with input data that has not been adequately processed. Thus, the application of the method of the invention can be used to identify cases where the quality of the data does not merit further quantitative AVO analysis without reprocessing.

Large time shifts between the near and far offset volumes are symptomatic of problems, such as incorrect NMO (normal moveout), in the original seismic data processing. Similarly, subvolumes showing low cross correlation coefficients can also be indicative of processing problems that need to be addressed before further AVO analysis is conducted. Through inspection of the initial time shift volume, problem areas are readily identified. This inspection is preferably by, but not limited to, visualization of the initial time shift and maximum correlation volumes. In particular, by examining the magnitude and the continuity of time shifts values in the initial time shift volume and the magnitude and the continuity of cross-correlation values in the maximum correlation volume, an interpreter is able to determine in which areas the offset seismic data quality is sufficient for further quantitative AVO analysis. Another embodiment uses a cross plot of maximum correlation vs. initial time shift values to determine areas of high time shift value and low maximum correlation. This is shown below in the discussion of FIG. 7.

In step 108, the areas of inappropriate time shift determined in step 106 and the areas of inappropriate correlation determined in step 107 are filtered out from the initial time-shift volume created in step 104, generating a filtered time shift volume. In an alternative embodiment, the filtered time shift volume can be further filtered to ensure that a smoothly varying time-shift is applied to the data. The filtering of the time shift volume is spatially and temporally adaptive, based on the quality of the maximum correlation volume and the magnitude of the initial time shift volume, generating a filtered time shift volume.

Finally, in step 109, the filtered time shift volume generated in step 108 is applied to the far-offset seismic volume selected in step 101 to generate a time-aligned far-offset seismic data volume. The filtered time shift volume is used to time-shift the seismic data into time-alignment, again with sub-sample interpolation. In an alternative embodiment, the filtering process of steps 104 through 109 can be run iteratively with one to several iterations.

In another alternative embodiment, seismic horizons that have been previously interpreted in the multiple seismic data volumes from step 101 can be integrated into the alignment algorithm as a local interpretative constraint. Combining interpreted horizons to constrain the volume-based time-alignment permits geologic insight to directly influence the alignment. However, the method of the present invention does not require the use of pre-calculated seismic horizons as a constraint. This is an advantage since the production of seismic horizons is very time consuming.

Now the offset seismic data volumes are properly time-aligned and ready for reliable and accurate mathematical manipulation. Thus, the offset volumes could be differenced to examine AVO behavior, using, for example, near*(far-near), far*(far-near), abs(far-near), where * denotes multiplication and abs denotes absolute value. Alternatively, the offset volumes could be translated into an AVO attribute volume such as $\lambda a+b$, or other slope-intercept transformations. Additionally, derivative volumes such as a+b, $\lambda a+b$, or other AVO attribute data can be used as the input for seismic facies classification, hydrocarbon fluid system mapping and identification and geologic interpretation.

The method of the invention, as described in, but not limited to, the above embodiments, has many advantages. Among the main advantages of the use of this method over more traditional horizon-based techniques, such as manual alignment via interpretation, is that the entire volume is considered and aligned during the alignment calculation. This is a significant advantage over traditional, horizon based mapping or "bulk-shift" techniques for multi-cycle reservoirs and for quality control above and below the reservoir.

The retention and analysis of the initial time shift and maximum correlation volumes created in steps 104 and 105 to create spatially-and temporally-aligned seismic data volumes is another advantage of the method of the invention. These volumes assist in the use of volumetric AVO attribute data for reservoir identification and characterization. These volumes can be used to produce AVO anomaly classification volumes. Any of a number of methods for producing the AVO anomaly classification volumes known in the art of seismic processing can be used. However, the preferred method uses a probabilistic neural network approach and is described in a concurrently filed, copending patent application entitled, "Method for Classifying AVO Data Using an Interpreter-Trained Neural Network". This method is preferred for its accuracy, speed, and versatility. This method is briefly outlined here.

AVO anomalies are classified in near-offset and far-offset seismic data volumes, by first calculating a plurality of initial AVO seismic attributes representative of the offset seismic data volumes. A probabilistic neural network is constructed from the calculated initial AVO seismic attributes. AVO anomaly classifications are calculated in a portion of the offset seismic data volumes. The preceding steps are repeated until the calculated AVO anomaly classifications in the portion of the offset seismic data volumes are satisfactory. AVO anomaly classifications are calculated throughout the offset seismic data volumes using the constructed probabilistic neural network.

EXAMPLES

Figure 5A:
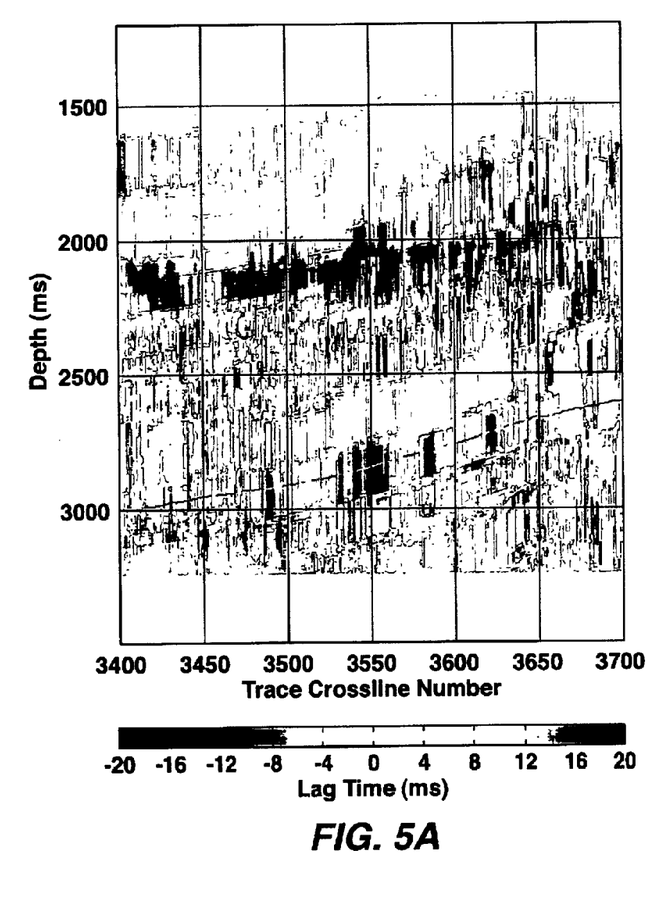
FIG. 5A is a cross-section view of the initial time-shift volume created by applying the method of the invention to an example set of near-offset and far-offset seismic data volumes.
Figure 5B:
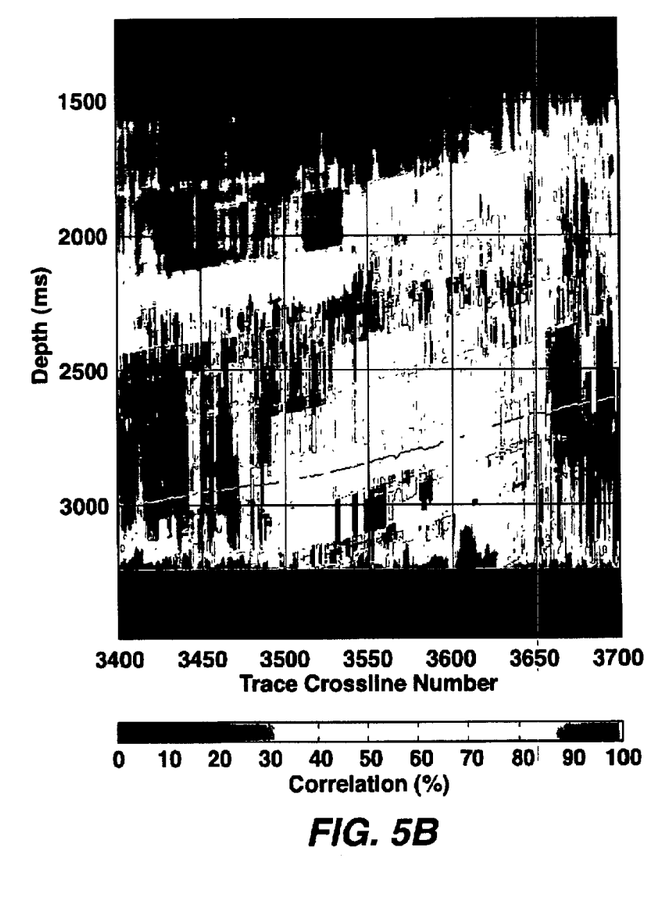
FIG. 5B is a cross-section view of the maximum correlation volume created by applying the method of the invention to the example in FIG. 5A.

FIGS. 5A and 5B show the results of applying the method of the invention to an example set of near-offset and far-offset seismic data volumes. FIG. 5A shows a cross-section view of the initial time-shift volume created by the method of the invention. FIG. 5B shows a cross-section view of the maximum correlation volume created by the method of the invention.

Figure 6A:
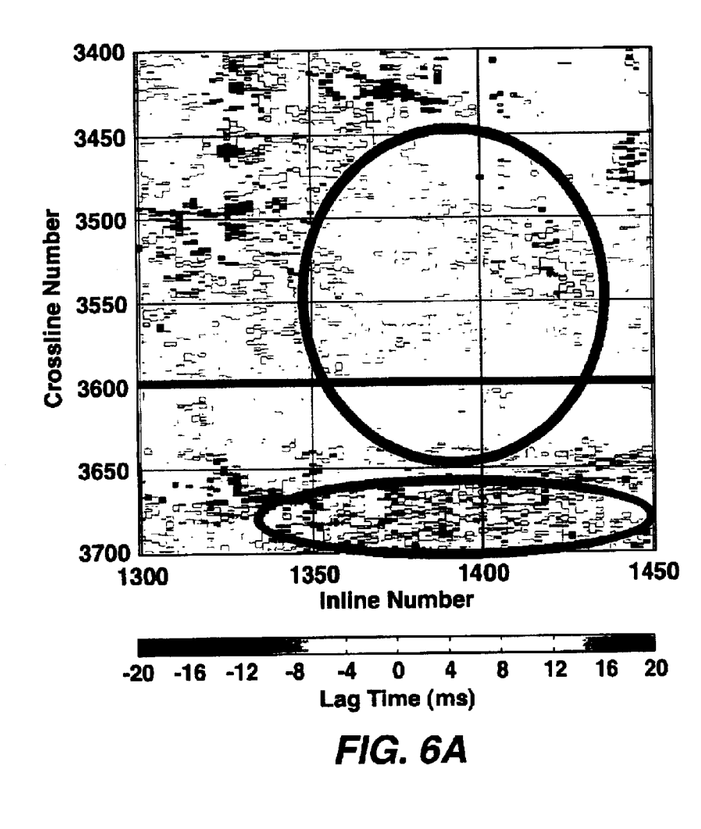
FIG. 6A is a time slice view of the initial time-shift volume shown in FIG. 5A.
Figure 6B:
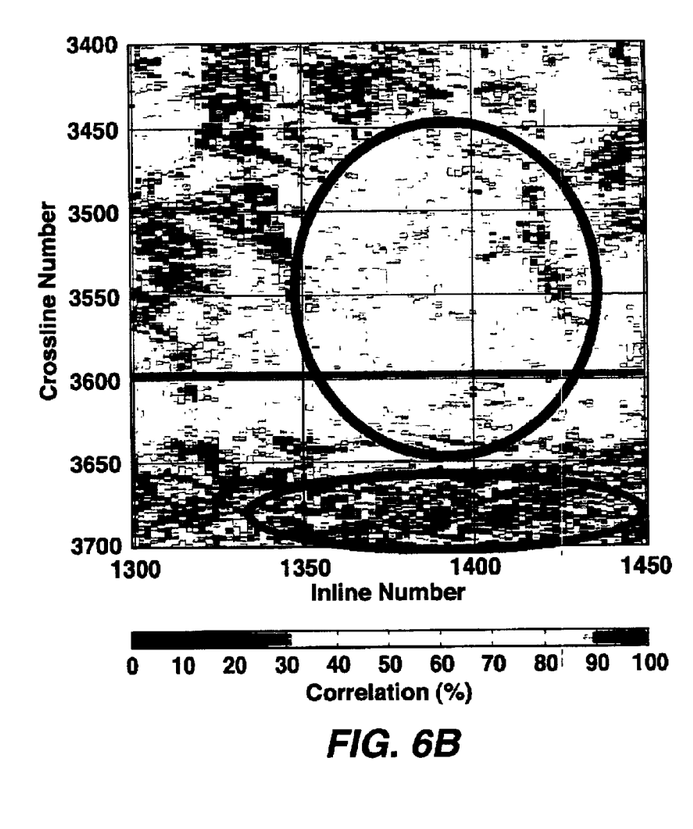
FIG. 6B is a time slice view of the maximum correlation volume shown in FIG. 5B.

FIGS. 6A and 6B show further results of applying the method of the invention to the example used in FIGS. 5A and 5B. FIG. 6A shows a time slice view of the initial time-shift volume shown in FIG. 5A. FIG. 6B shows a time slice view of the maximum correlation volume shown in FIG. 5B. The time-shift volume needs to be filtered to produce a resulting time alignment of the offset seismic data volumes that is spatially and temporally consistent in areas such as that contained within the oval near the bottom of FIGS. 6A and 6B. Contrasted with the lower ovals, the data in the upper ovals show good spatial continuity (FIG. 6A) and high (~60%) correlation (FIG. 6B). This demonstrates that the magnitude of the time-shift volume and the quality of the maximum correlation volume are critical pieces of information to determine if data quality is sufficient for quantitative AVO analysis.

Figure 7:
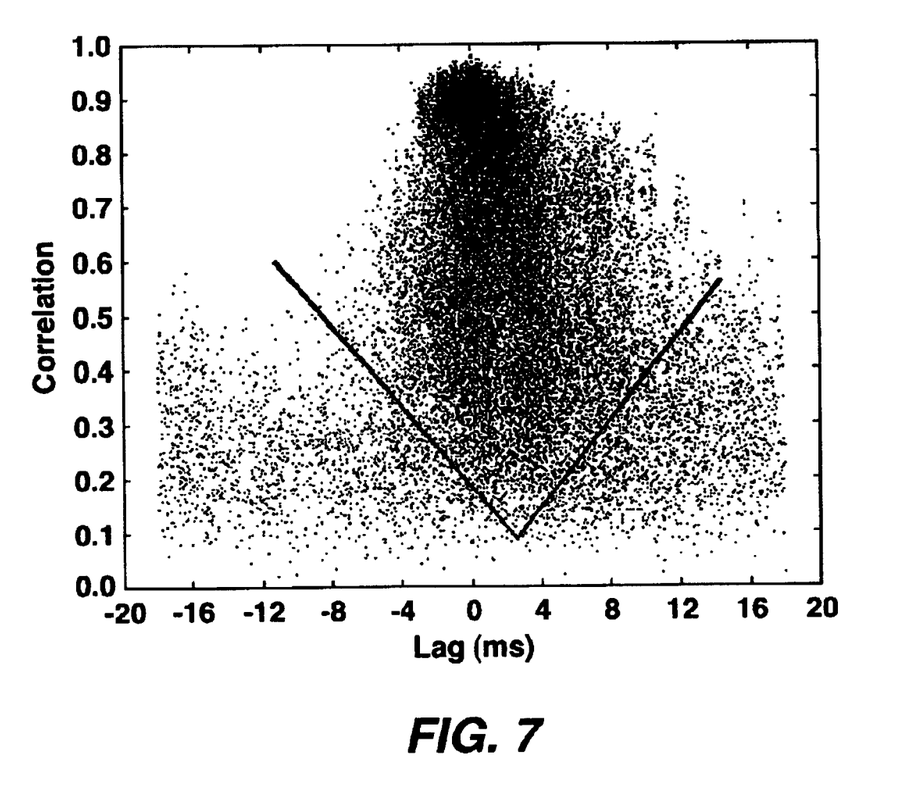
FIG. 7 is a cross plot of maximum correlation vs. time-shift from the example used in FIGS. 5A and 5B.

FIG. 7 shows a cross plot of maximum correlation vs. time-shift in the example used in FIGS. 5A and 5B. This can be used in an embodiment of the method of the invention to interactively filter those portions of the initial time-shift volume that exhibit high lag values and low correlations.

Figure 8A:
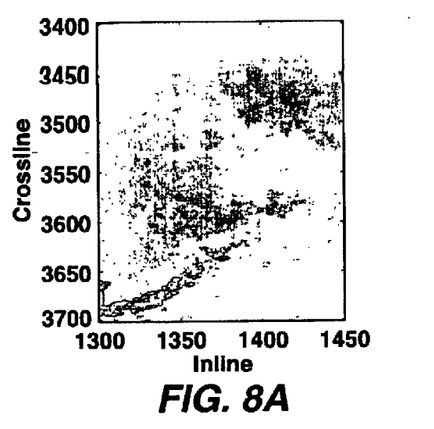
FIGS. 8A–8F are a comparison of three time slices of the initial time-shift volume from FIG. 5A, shown before and after filtering using the cross plot from FIG. 7.
Figure 8B:
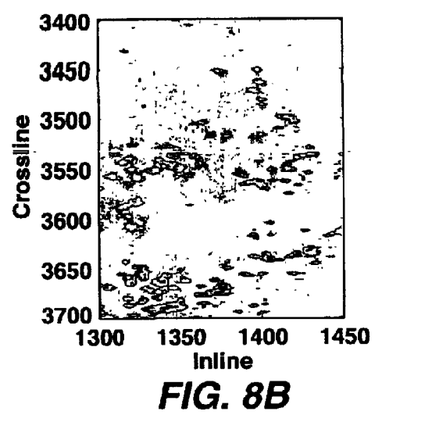
Figure 8C:
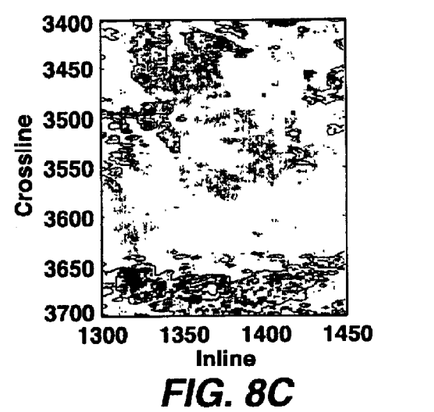
Figure 8D:
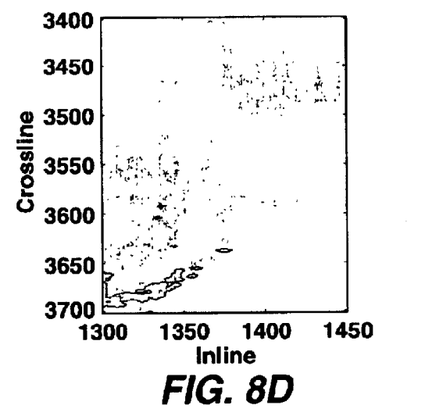
Figure 8E:
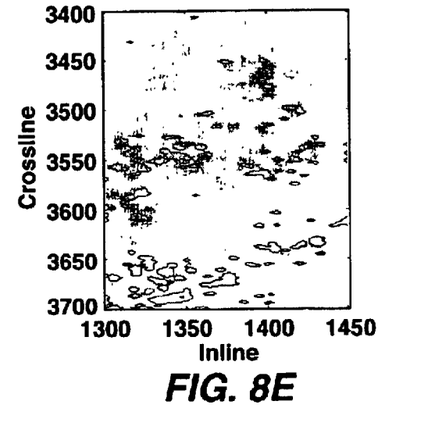
Figure 8F:
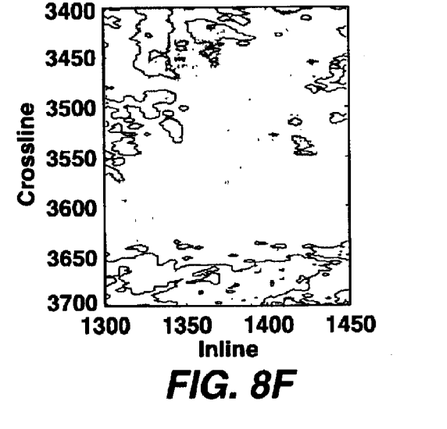

FIGS. 8A–8F show the effect of filtering the initial time shift volume using an embodiment of the method of the invention. FIGS. 8A–8C show three different time slices (2100 ms, 2352 ms, and 2604 ms) of the initial time-shift volume before filtering. FIGS. 8D–8F show the corresponding time slices of the filtered time-shift volume after filtering, as described in steps 106 through 108 of FIG. 1. Black contours correspond to the portion of the cross plot of maximum correlation vs. time-shift that was selected for filtering and shown in FIG. 7.

Figure 9:
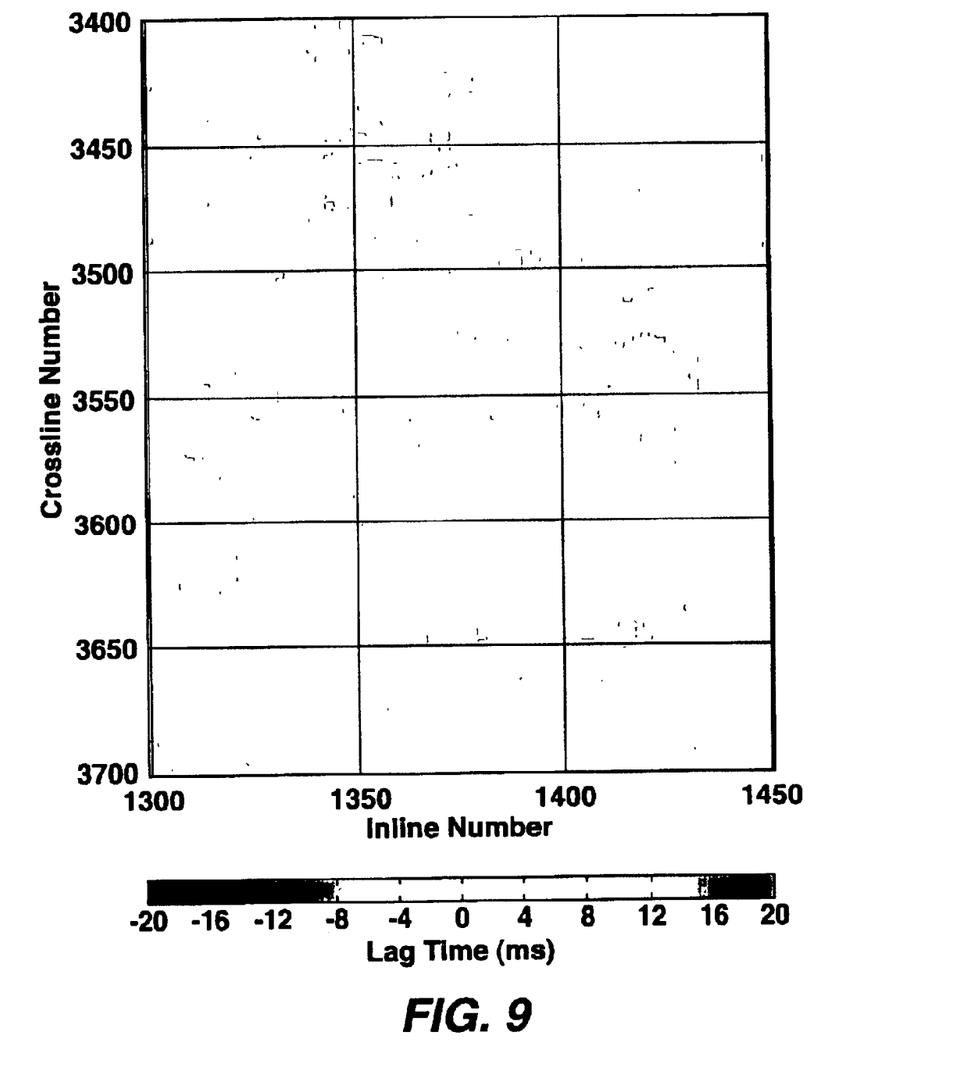
FIG. 9 is a time slice of a filtered time-shift volume, corresponding to FIG. 6A, after applying the filtering and horizon-guided time-alignment of an embodiment of the method of the invention.

FIG. 9 shows the effect of applying the filtering and horizon-guided time-alignment of an embodiment of the method of the invention. The time slice of the time-shift volume corresponding to FIG. 6A is shown, after applying the filtering and horizon-guided time-alignment. Comparing FIG. 9 to FIG. 6A demonstrates that good time alignment has been achieved and that continuity in the time-shift volume is critical for reliable time-alignment results.

Figure 10A:
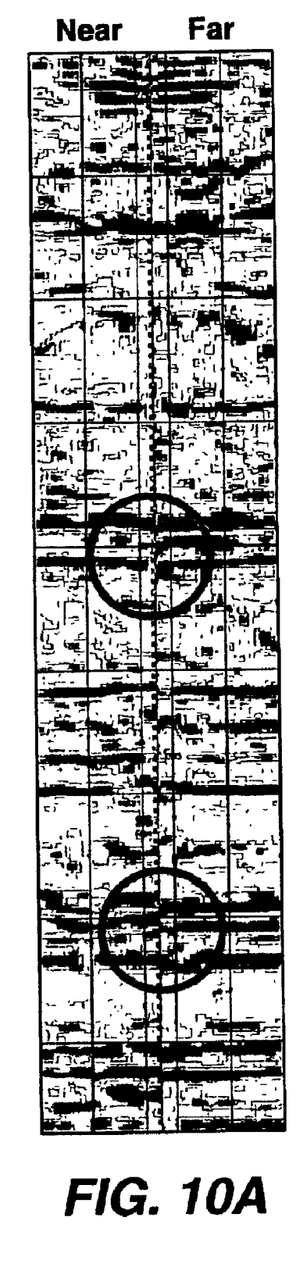
FIG. 10A is a mirror image display of near-and far-offset seismic data volumes.
Figure 10B:
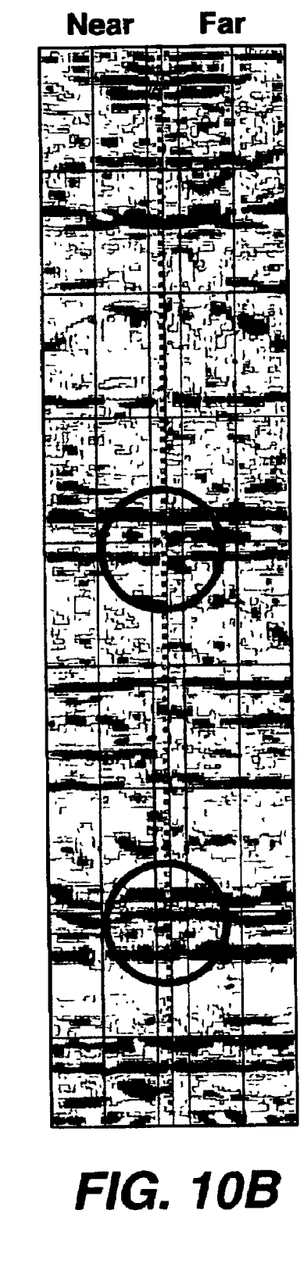
FIG. 10B is a mirror image display of near-and far-offset volumes after applying the time-alignment filtering of an embodiment of the method of the invention.

FIGS. 10A and 10B illustrate the effect of applying the time-alignment filtering of an embodiment of the method of the invention to near-and far-offset seismic data volumes. Depth is displayed in the vertical dimension and cross-line position in the horizontal. FIG. 10A shows a mirror image display of the near-and far-offset volumes. Here, the vertical dotted line denotes the suture line separating the near-and far-offset volumes. The top circle highlights an upper zone where minor misalignment is initially present, while the bottom circle denotes an area where more significant misalignment is present. FIG. 10B shows the result after time-alignment by the present inventive method. A marked improved along the entire suture line is evident, but particularly within the two circles corresponding to the misalignment zones in FIG. 10A.

In conclusion, the method of the invention improves the ability of geoscience interpreters to perform quantitative volumetric AVO (Amplitude Versus Offset) analysis for exploration, development and production scenarios. Specifically, this method improves the alignment between multiple offset seismic volumes, thereby allowing accurate construction and manipulation of AVO signatures. This contributes to the ability to interpret and integrate three-dimensional subsurface information, particularly three-dimensional seismic data.

The method of the invention is capable of creating AVO derivative volumes that can be critical for reservoir characterization, hydrocarbon fluid system mapping and geologic model building. The ability to transform raw near and far offset seismic amplitude volumes into time-aligned and derivative AVO volumes will result in significant time reduction, improved accuracy, and reproducibility within the seismic reservoir characterization work process. Seismic AVO volumes are used for general analysis of reservoir geometry and continuity, for well placement, and to condition geologic models for use in development planning and reservoir management. In addition to AVO applications, the present invention can be used with time-lapse 4D seismic data, and with surveys that have multiple versions of seismic processed data. Time-lapse seismic involves detecting differences between two seismic surveys of the same region conducted at different times when changes may be expected due to production from the region or other causes.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

What is claimed is:

1. A method for time-aligning near-offset and far-offset seismic data volumes, comprising the steps of:
   (a) selecting a plurality of time shifts;
   (b) cross-correlating the near-offset and far-offset seismic data volumes at the plurality of time shifts;
   (c) creating an initial time-shift volume and a maximum correlation volume from the maximal cross-correlations at the plurality of time shifts;
   (d) determining areas of high time shift from the initial time-shift volume and areas of low cross-correlation from the maximum correlation volume;
   (e) filtering the determined areas of high time shift and low cross-correlation from the initial time-shift volume, generating a filtered time-shift volume; and
   (f) applying the filtered time-shift volume to the far-offset seismic volume to generate a time-aligned far-offset volume.

2. The method of claim 1, wherein steps (b) through (f) are repeated in an iterative process.

3. The method of claim 1, further comprising the step of:
   combining the near-offset seismic data volume and the time-aligned far-offset seismic data volume into a derivative AVO attribute volume.

4. The method of claim 1, further comprising the step of:
   using previously interpreted seismic horizons to constrain time alignment of the far-offset seismic data volume.

5. A method for producing AVO anomaly classification volumes from a near-offset seismic data volume and a far-offset seismic data volume, comprising the steps of:
   (a) selecting a plurality of time shifts;
   (b) cross-correlating the near-offset and far-offset seismic data volumes at the plurality of time shifts;
   (c) creating a time-shift volume and a maximum correlation volume from the maximal cross-correlations at the plurality of time shifts; and
   (d) using the time-shift volume and the maximum correlation volume to produce AVO anomaly classification volumes.

6. The method of claim 5 wherein the AVO anomaly classification volume is produced using a probabilistic neural network.

7. A method for time-aligning a first seismic data volume and a second seismic data volume, both data volumes pertaining to the same spatial region, said method comprising the steps of:
   (a) selecting a plurality of time shifts;
   (b) cross-correlating the first seismic data volume and the second seismic data volume at the plurality of time shifts;
   (c) creating an initial time-shift volume and a maximum correlation volume from the maximal cross-correlations at the plurality of time shifts;
   (d) determining areas of high time shift from the initial time-shift volume and areas of low cross-correlation from the maximum correlation volume;
   (e) filtering the determined areas of high time shift and low cross-correlation from the initial time-shift volume, generating a filtered time-shift volume; and
   (f) applying the filtered time-shift volume to the second seismic data volume to generate a time-aligned second seismic data volume.

8. The method of claim 7, wherein said first seismic data volume and second seismic data volume are data from two seismic surveys conducted at different times.

* * * * *